US012639543B2

(12) United States Patent
Johnson et al.

(10) Patent No.:  US 12,639,543 B2
(45) Date of Patent:      May 26, 2026

(54) SELECTIVE RADIO FREQUENCY IDENTIFICATION SHIELDING

(71) Applicant: TOSHIBA GLOBAL COMMERCE SOLUTIONS, INC., Durham, NC (US)

(72) Inventors: Brad M. Johnson, Raleigh, NC (US); David J. Steiner, Durham, NC (US); Kimberly A. Wood, Raleigh, NC (US); Timothy W. Crockett, Raleigh, NC (US)

(73) Assignee: TOSHIBA GLOBAL COMMERCE SOLUTIONS, INC., Durham, NC (US)

( * ) Notice: Subject to any disclaimer, the term of this patent is extended or adjusted under 35 U.S.C. 154(b) by 0 days.

(21) Appl. No.: 18/331,096

(22) Filed: Jun. 7, 2023

(65) Prior Publication Data

US 2024/0412024 A1     Dec. 12, 2024

(51) Int. Cl.
*G06K 19/073*          (2006.01)

(52) U.S. Cl.
CPC .............................. *G06K 19/07318* (2013.01)

(58) Field of Classification Search
CPC ......... G06K 19/07318; G06K 7/10079; H04K 3/00; H04K 3/68
See application file for complete search history.

(56) References Cited

U.S. PATENT DOCUMENTS

| | | | | |
|---|---|---|---|---|
| 1,716,208 A | * | 6/1929 | Clifford ................... | B61L 3/221 |
| | | | | 246/190 |
| 3,994,505 A | * | 11/1976 | Balha .................... | B62B 3/1404 |
| | | | | 280/33.994 |
| 4,215,796 A | * | 8/1980 | Johnston .............. | B65D 50/067 |
| | | | | 220/4.23 |
| 4,545,591 A | * | 10/1985 | Balha .................... | B62B 3/1404 |
| | | | | 280/33.994 |
| 4,785,136 A | * | 11/1988 | Mollet ................... | H05K 9/009 |
| | | | | 174/386 |
| 4,960,302 A | * | 10/1990 | Walters ................. | B62B 3/1436 |
| | | | | 296/78.1 |
| 5,195,644 A | * | 3/1993 | Schmid .................. | B65D 1/225 |
| | | | | 220/680 |
| 5,271,634 A | * | 12/1993 | Walton .................. | B62B 3/1436 |
| | | | | 160/23.1 |
| 5,516,127 A | * | 5/1996 | Glazer ................... | B62B 5/021 |
| | | | | 280/5.2 |
| 5,541,670 A | * | 7/1996 | Hanai .................... | H04N 5/765 |
| | | | | 348/E7.054 |

(Continued)

*Primary Examiner* — Daniel I Walsh

(74) *Attorney, Agent, or Firm* — Patterson + Sheridan, LLP; Gero G. McClellan

(57)                    ABSTRACT

The present disclosure provides improved apparatuses for selective radio frequency identification shielding. A container is provided, the container including a plurality of sides comprising a bottom side on which items can be placed and one or more wall sides to contain the items, where at least one of the plurality of sides is permeable to a radio frequency (RF) used to identify items in the container, and one or more sides of the plurality of sides comprise an RF shield arranged to block the one or more sides such that radio waves used to identify items in the container are blocked by the one or more blocked sides. The container further includes at least one opening through which items can be placed into the container.

15 Claims, 5 Drawing Sheets

(56) References Cited

U.S. PATENT DOCUMENTS

| | | | | |
|---|---|---|---|---|
| 5,729,697 | A * | 3/1998 | Schkolnick | G06Q 20/208 |
| | | | | 235/383 |
| 5,822,714 | A * | 10/1998 | Cato | G06K 7/10039 |
| | | | | 702/108 |
| 6,054,647 | A * | 4/2000 | Ridener | H05K 9/009 |
| | | | | 174/394 |
| 7,225,980 | B2 * | 6/2007 | Ku | G07F 7/02 |
| | | | | 235/383 |
| 7,295,114 | B1 * | 11/2007 | Drzaic | G08B 13/2417 |
| | | | | 340/8.1 |
| 7,598,871 | B2 * | 10/2009 | Napolitano | G06K 19/04 |
| | | | | 340/568.1 |
| 8,143,997 | B2 * | 3/2012 | Marr, III | H04Q 9/00 |
| | | | | 235/383 |
| 8,781,908 | B2 * | 7/2014 | Lewis | G07G 1/0045 |
| | | | | 705/16 |
| 9,760,826 | B1 * | 9/2017 | Stine | G06K 7/10079 |
| 9,830,486 | B2 * | 11/2017 | Roth | H01Q 17/00 |
| 10,275,821 | B2 * | 4/2019 | Clark | G06Q 30/0633 |
| 10,648,964 | B2 * | 5/2020 | Rice | G01N 33/483 |
| 11,040,736 | B1 * | 6/2021 | Tejada | B62B 5/065 |
| 11,275,982 | B1 * | 3/2022 | Landry | G06K 7/10356 |
| 11,599,762 | B2 * | 3/2023 | Oishi | G07G 1/009 |
| 11,714,975 | B2 * | 8/2023 | Roth | G06K 7/10316 |
| | | | | 340/10.1 |
| 2003/0085538 | A1 * | 5/2003 | Mansons | B62B 3/146 |
| | | | | 280/33.992 |
| 2006/0175778 | A1 * | 8/2006 | Rose | B62B 3/1436 |
| | | | | 280/33.992 |
| 2006/0208072 | A1 * | 9/2006 | Ku | G07F 7/02 |
| | | | | 235/383 |
| 2006/0255951 | A1 * | 11/2006 | Roeder | H01Q 1/22 |
| | | | | 340/572.1 |
| 2006/0290494 | A1 * | 12/2006 | O'Brien | A47F 9/046 |
| | | | | 340/568.5 |
| 2007/0034692 | A1 * | 2/2007 | Johnson | G07G 1/009 |
| | | | | 235/383 |
| 2007/0040024 | A1 * | 2/2007 | Murofushi | G06K 7/12 |
| | | | | 235/383 |
| 2008/0004908 | A1 * | 1/2008 | Oh | G16H 40/20 |
| | | | | 340/572.1 |
| 2008/0174407 | A1 * | 7/2008 | Chen | G06K 7/10079 |
| | | | | 340/10.1 |
| 2008/0283596 | A1 * | 11/2008 | Ishida | B65G 1/1371 |
| | | | | 705/28 |
| 2010/0123559 | A1 * | 5/2010 | Wilkinson | H01Q 1/007 |
| | | | | 340/10.4 |
| 2011/0127796 | A1 * | 6/2011 | Fontenot-Martin | B62B 3/1436 |
| | | | | 296/100.01 |
| 2012/0019364 | A1 * | 1/2012 | Reichenbach | G06K 7/10435 |
| | | | | 340/10.1 |
| 2012/0075073 | A1 * | 3/2012 | Fislage | G06K 7/10198 |
| | | | | 340/10.1 |
| 2012/0249303 | A1 * | 10/2012 | Hadley | H02M 7/217 |
| | | | | 235/492 |
| 2014/0027511 | A1 * | 1/2014 | Plocher | G06K 7/10 |
| | | | | 235/439 |
| 2014/0202905 | A1 * | 7/2014 | Kamath | B65D 25/14 |
| | | | | 53/472 |
| 2014/0350715 | A1 * | 11/2014 | Gopalakrishnan | G06Q 10/087 |
| | | | | 700/215 |
| 2015/0127362 | A1 * | 5/2015 | DeBusk | G07F 17/0092 |
| | | | | 705/2 |
| 2017/0181912 | A1 * | 6/2017 | Rapoport | A61G 11/005 |
| 2017/0186072 | A1 * | 6/2017 | Clark | G06Q 30/0633 |
| 2017/0345522 | A1 * | 11/2017 | Campbell | G21F 5/06 |
| 2018/0164167 | A1 * | 6/2018 | Wilkinson | G01L 1/16 |
| 2018/0212904 | A1 * | 7/2018 | Smullen | H04L 51/02 |
| 2018/0232550 | A1 * | 8/2018 | Shimura | H01Q 1/27 |
| 2018/0313877 | A1 * | 11/2018 | Brant | G01R 23/02 |
| 2019/0221914 | A1 * | 7/2019 | Kato | G06K 19/07773 |
| 2019/0263538 | A1 * | 8/2019 | O'Brien | B64U 80/40 |
| 2019/0362109 | A1 * | 11/2019 | Kojima | G06K 7/10009 |
| 2020/0226888 | A1 * | 7/2020 | Suzuki | A47F 9/048 |
| 2020/0320814 | A1 * | 10/2020 | Hastings | G01V 5/20 |
| 2021/0158954 | A1 * | 5/2021 | Okuda | F25D 25/02 |
| 2021/0188338 | A1 * | 6/2021 | Killy | B62B 3/1484 |
| 2021/0248879 | A1 * | 8/2021 | Khojastepour | G06N 3/0499 |
| 2022/0004723 | A1 * | 1/2022 | Suzuki | G06K 7/10079 |
| 2022/0012438 | A1 * | 1/2022 | Okayama | G06K 19/0715 |
| 2022/0140521 | A1 * | 5/2022 | Urtz, Jr. | H01R 13/5205 |
| | | | | 439/271 |
| 2022/0188529 | A1 * | 6/2022 | Markman | G06K 19/0725 |
| 2022/0261563 | A1 * | 8/2022 | Sakurai | G06K 7/10366 |
| 2022/0414356 | A1 * | 12/2022 | Roth | G06K 7/10445 |
| 2023/0036947 | A1 * | 2/2023 | Roth | G06Q 20/208 |
| 2023/0055185 | A1 * | 2/2023 | Uchimura | G07G 1/0036 |
| 2023/0098110 | A1 * | 3/2023 | Yadav | G06V 40/13 |
| | | | | 382/103 |
| 2023/0264898 | A1 * | 8/2023 | Ikawa | B65G 1/0492 |
| | | | | 700/215 |
| 2023/0363562 | A1 * | 11/2023 | O'Toole | A47G 29/16 |
| 2024/0095474 | A1 * | 3/2024 | Sakurai | G06K 7/10009 |
| 2024/0135133 | A1 * | 4/2024 | Imai | G06K 17/0022 |
| 2024/0242702 | A1 * | 7/2024 | Fedorov | H04K 3/90 |
| 2024/0330886 | A1 * | 10/2024 | Crockett | G07G 1/0018 |
| 2024/0412024 | A1 * | 12/2024 | Johnson | G06K 19/07318 |

* cited by examiner

SELECTIVE RADIO FREQUENCY IDENTIFICATION SHIELDING

BACKGROUND

Radio frequency identification (RFID) technology generally allows items to be identified using wireless radio waves. In some cases, RFID systems use a sensor or reader to identify RFID tags in the vicinity. Generally, the sensor or reader emits radio waves which are detected by the tags, which may be self-powered (e.g., by a battery source) or which may receive their power from the radio waves themselves. When the sensor's radio waves are detected, the tag then generally responds indicating an identifier of the tag.

DETAILED DESCRIPTION

Figures 1A, 1B:
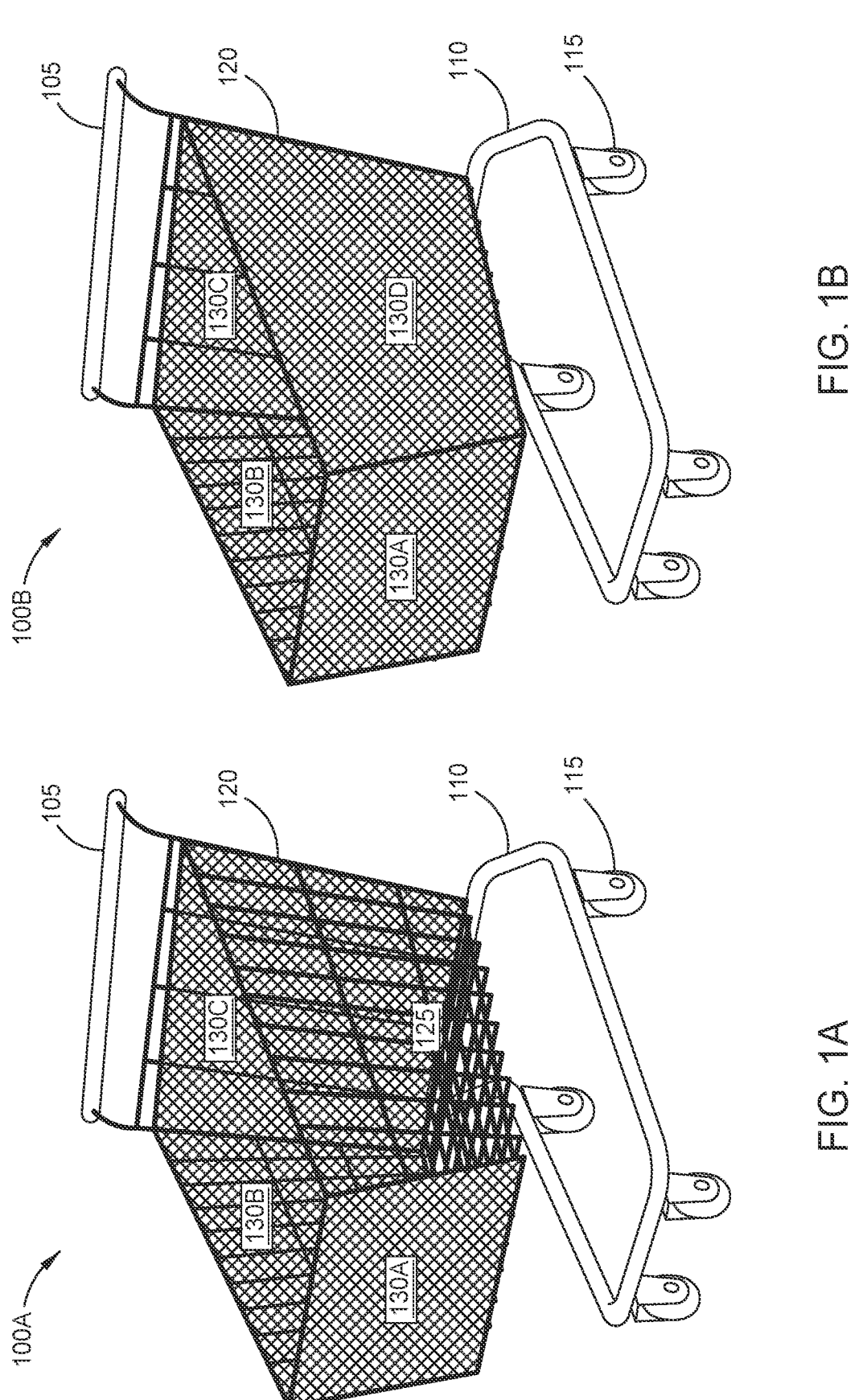
FIGS. 1A and 1B depict example shopping cart receptacles with selective RF shielding, according to one embodiment disclosed herein.

RFID can be used for a variety of purposes, including inventory tracking and management, item identification, and the like. However, though RFID technology allows the system to identify items, it does not enable the system to determine where the specific items are, what person the items or tags are associated with, and the like. This may be particularly problematic in congested settings where many RFID tags may be present, if it is desirable to more specifically identify the items.

In some aspects, RFID tags can be used to identify items, such as in retail settings (e.g., in a grocery store). For example, each item available for purchase in the store may have an RFID tag (e.g., integrated into or in some way affixed to the item and/or the packaging of the item). Generally, the RFID tags may include active tags (e.g., with their own power source) and/or passive tags (which are powered by the RFID sensor). By mapping the RFID tag's unique identifier to a product identifier (e.g., a bar code or universal product code (UPC), the item can be identified based on the RFID tag. For example, when a user brings the item near an RFID sensor (also referred to as a reader in some aspects), the sensor may detect the RFID identifier and determine what the item is based on the mappings.

In some embodiments, RFID technology may be used to detect or identify items without requiring a user to manually scan or otherwise present them. For example, rather than requiring a customer or employee to manually place the items on a conveyor or scanning zone, the items may be left in a shopping receptacle (e.g., a cart or basket) and the entire receptacle may be moved past or into the vicinity of an RFID sensor (or, in some cases, an RFID sensor may be moved past or into the vicinity of the receptacle). In some aspects, this allows the system to identify the items in the receptacle based on the detected RFID tags. This can allow the user to seamlessly purchase items, such as by automatically logging the items and completing the purchase as the user exits the store, and/or by automatically identifying them and allowing the user to complete the purchase (e.g., at a check-out kiosk).

However, to enable such aspects, it is important to distinguish which item corresponds to which user. For example, if multiple users (each with a shopping receptacle containing items) are in the same area (e.g., exiting a store, in line for a check-out kiosk, and the like), the system should know which items belong to each user (or at least which items belong to the user that is currently checking out). Conventional RFID, however, is directionless and generally detects any RFID tags that are within a fixed or configurable range.

In some embodiments, therefore, selective RF shielding is provided. In some embodiments, the RF shielding is used to block RF signals (e.g., from RFID readers) on one or more sides of a shopping receptacle, while one or more other sides are left unshielded (such that RFID signals can permeate the unshielded sides). That is, RF-impermeable shielding may be used to block RFID signals from entering the shopping receptacle (and triggering or identifying the tags therein) from some angle(s) or side(s), while allowing RFID signals to enter the receptacle (and triggering or the identifying the tags therein) from other angle(s) or side(s).

For example, a shopping cart may have shielding on the bottom and three of the four sides. The fourth side (e.g., the right lateral side) may be exposed to an RFID sensor (e.g., by rolling the cart past the sensor), allowing the sensor to detect the tags therein (through the RF-permeable right lateral side). However, the items in other nearby carts may be shielded until the cart is placed in the appropriate position and/or orientation relative to the sensor. In some embodiments, this may be referred to as a "sensing position."

In some aspects, the RFID sensors may also include or use RF shielding to control their directionality. For example, the RFID sensor may be located within a box or cylinder of RF-impermeable material, allowing tags to be read only when they are directly in front of an open end of the box or cylinder.

Generally, the specific configuration of RF shielding and the RFID sensor(s) may vary depending on the particular implementation, and are generally complementary. That is, the particular configuration of RFID sensors (e.g., their position and directionality) may be used to define the configuration of RF shielding on the shopping receptacles, and/or vice versa. For example, if the RFID sensor(s) are located on the left side of a path where shopping receptacles are passed (e.g., along a queue or conveyor belt), the shopping receptacles may include RF shielding on the front and back sides, as well as on the right side, but the left side may be unshielded. As another example, if the RFID sensor(s) are located beneath the path (e.g., in the floor facing up), the shopping receptacles may have RF shielding on all four sides, with an unshielded bottom.

Generally, the RF shielding can comprise any material or structure that is impermeable to radio frequencies or electromagnetic fields used by the RFID system. For example, the shielding may comprise a fine conductive mesh (e.g., a metal Faraday cage), a solid sheet of conductive material (e.g., metal), and the like. In some embodiments, some or all of the RF shielding is rigid (e.g., sheets or lattices of rigid metal). In some embodiments, some or all of the RF shielding is flexible or deformable (e.g., a netting of thin material).

In some embodiments, the RF shielding is integrated into the shopping receptacles. That is, one or more sides of the shopping receptacle may be constructed of the shielding itself (e.g., using a solid metal sheet for one side, as opposed to a conventional wire or plastic structure). In some embodiments, the RF shielding may be a discrete component that can be selectively added and/or removed from the shopping receptacle. For example, the RF shielding may comprise one or more panels (which can include solid panels or mesh panels) that can be affixed (permanently or temporarily) to the desired sides of the receptacle, such as via cable ties (also referred to as zip ties), clips, magnets, bolts and nuts, or any other suitable fasteners. In some embodiments, the RF shielding comprises a mesh fabric that can be stretched over or otherwise attached to a conventional shopping receptacle.

In this way, the scanning system may be unable to identify or detect items in any receptacles that are not in the sensing position and/or orientation of the RFID sensor. By allowing no more than one receptacle in the sensing position and/or orientation of a given RFID sensor at a time, the system can readily determine that any identified item(s) are in one shopping receptacle and therefore belong to a group that corresponds to the receptacle's associated user (e.g., the customer). This can substantially reduce inaccuracies and error in the item or inventory management, such as by preventing the user from forgetting to scan any items, preventing the system from mistakenly identifying item(s) from other users, and the like. Further, by automatically identifying all of the items in the given receptacle, the system enables expedited or streamlined checkout or other processes because users need not manually scan each item.

FIGS. 1A and 1B depict example shopping cart receptacles 100 with selective RF shielding, according to one embodiment disclosed herein. Specifically, FIG. 1A depicts a shopping receptacle 100A that includes shielding on a subset of the walls of the container, while FIG. 1B depicts a shopping receptacle 100B with shielding on all of the walls. In the illustrated example, the shopping receptacles 100A and 100B are shopping carts that can be pushed or pulled by users.

With reference to FIG. 1A, the shopping receptacle 100A generally comprise a container 120 to store or hold items, a frame 110, wheels 115 (or some other means of conveyance), and a handle 105 to hold, push, lift, or otherwise move the shopping receptacle 100A. Generally, the specific design of the shopping receptacle 100A may vary depending on the particular implementation. For example, the shopping receptacle 100A may include one or more additional handles 105 (or no handles), one or more additional containers 120 (e.g., a second or third container to hold items), a different size or shape frame 110, a different number of wheels 115 (or other non-wheel means of conveyance), and the like.

As illustrated, the container 120 of the shopping receptacle 100A generally has a plurality of sides, which may include one or more bottom sides (e.g., on the bottom of the container) onto which items can be placed (e.g., to support the items against gravity), one or more wall sides, and/or one or more top sides (e.g., if the container has a lid). Generally, the specific presence (or absence) and arrangement of sides may vary depending on the particular implementation. In the illustrated example, the container 120 includes a front or anterior wall side (also referred to in some embodiments as a transverse or axial side), which may be defined by the intended or designed direction in which the shopping receptacle is pushed during use, a rear, back, or posterior wall side (also referred to as a transverse or axial side in some embodiments), which may be the side nearest the handle 105 where the user stands when pushing the cart, and two lateral wall sides (also referred to in some embodiments as longitudinal sides). In some aspects, the lateral wall sides are referred to as a left and right side, as defined by the intended direction of motion. The container 120 includes an opening at the top, allowing users to place items into the container 120 as well as to remove items from the container 120.

In the illustrated example, the container 120 of the shopping receptacle 100A includes RF shielding 130A-C on three sides (referred to in some aspects as blocked or shielded sides). Specifically, the RF shielding 130 covers the front wall side (with RF shielding 130A), the right lateral wall side (with RF shielding 130B), and the rear wall side (with RF shielding 130C). The left lateral wall side of the container 120 is an unshielded side 125 (referred to in some aspects as an unblocked or non-blocked side). In this way, RF may be able to permeate or penetrate into the container 120 when transmitted from the left side of the container 120 (or from above and below, if these sides are left unshielded as well), but cannot penetrate or permeate into the container 120 if transmitted from the right side, front, or rear of the container 120. That is, the RF may be blocked by the RF shielding 130. As used herein, "blocking" RF may generally include any technique or event that prevents the RF from permeating or passing through a space or container, including reflecting the RF, absorbing the RF, and the like.

Although depicted as discrete segments of RF shielding 130A-C, in some embodiments, the RF shielding may be implemented as a single component (e.g., three panels bolted together, a monolithic piece formed by bending flat panels, and/or a flexible mesh wrapped around the container 120).

In some embodiments, the configuration of RF shielding 130 on the shopping receptacle 100A is selected or determined based on the configuration of the corresponding RFID sensors. For example, the shopping receptacle 100A may be used in conjunction with RFID sensors that are arranged to scan items as receptacles are moved from right to left of the sensor (with the left, unshielded side 125 of the receptacles facing the sensor).

Turning to FIG. 1B, the shopping receptacle 100B similarly comprises a container 120 to store or hold items, a frame 110, wheels 115 (or some other means of conveyance), and a handle 105 to hold, push, lift, or otherwise move the shopping receptacle 100B.

As illustrated, the container 120 of the shopping receptacle 100B also has a plurality of sides, and the container 120 of the shopping receptacle 100B includes RF shielding 130A-D on four sides (referred to in some aspects as blocked or shielded sides). Specifically, the RF shielding 130 covers the all four wall sides of the container 120. In this way, RF may be unable to permeate or penetrate into the container 120 when transmitted from any of the wall sides of the container 120, but may be able to penetrate or permeate the container 120 if transmitted from directly above (through the opening in the container) or below (which may be unshielded).

In some embodiments, the configuration of RF shielding 130 on the shopping receptacle 100B is similarly selected or determined based on the configuration of the corresponding RFID sensors. For example, the shopping receptacle 100B may be used in conjunction with RFID sensors that are arranged to scan items from above or below as receptacles are moved over or under the sensor.

Figure 2B:
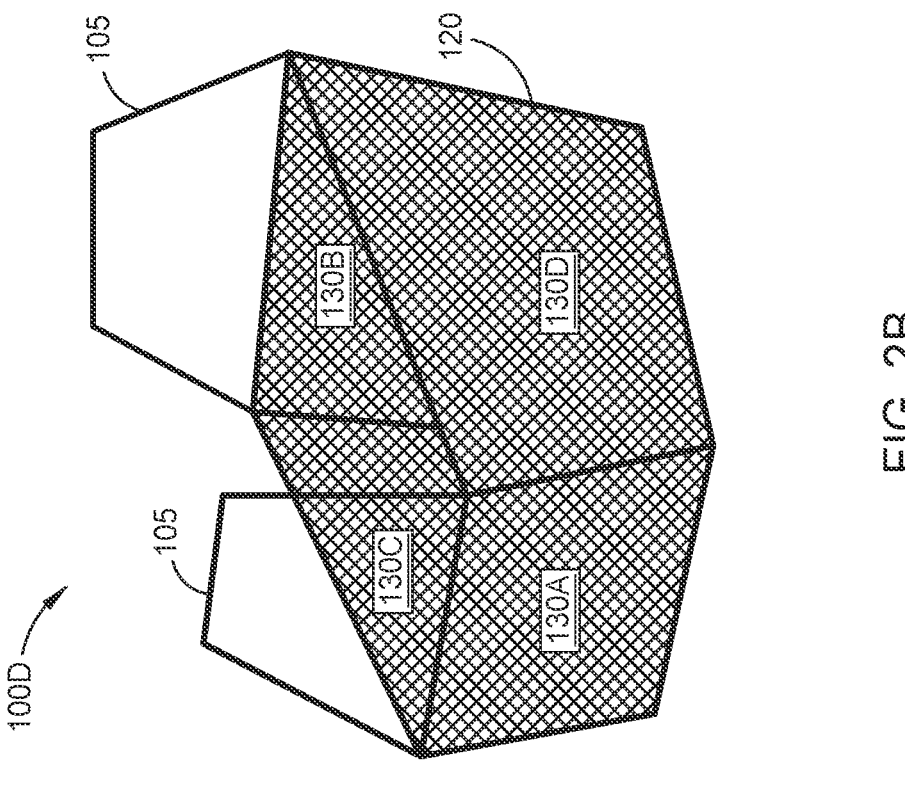
FIGS. 2A and 2B depicts example shopping basket receptacles with selective RF shielding, according to one embodiment disclosed herein.
Figure 2A:
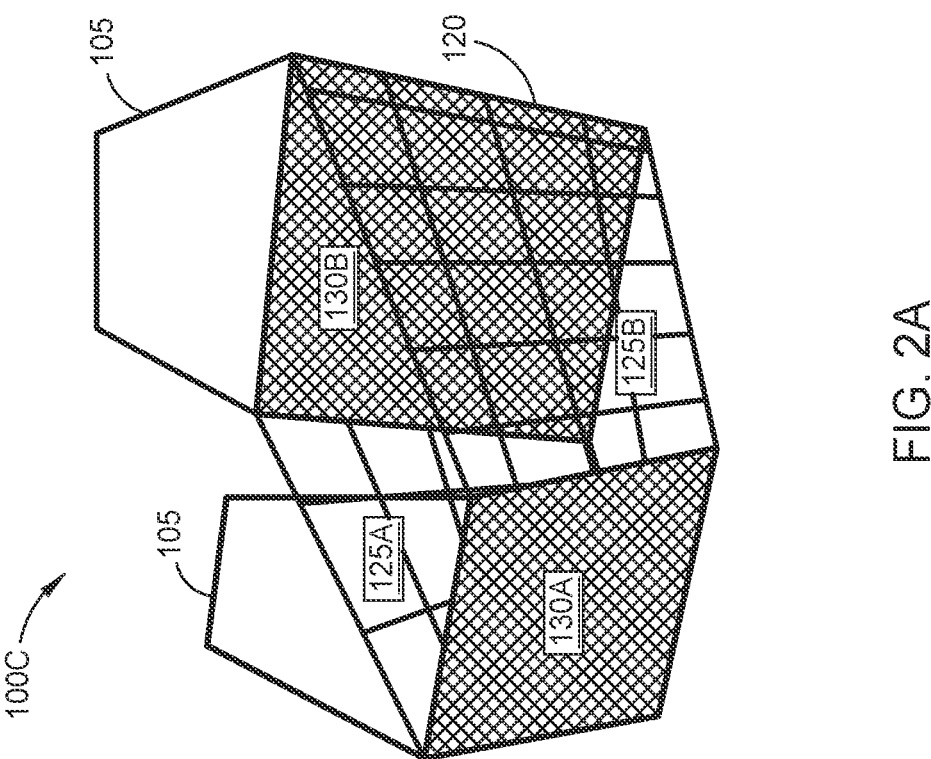

FIGS. 2A and 2B depict example shopping basket receptacles 100 with selective RF shielding, according to one embodiment disclosed herein. Specifically, FIG. 2A depicts a shopping receptacle 100C that includes shielding on a subset of the walls of the container, while FIG. 2B depicts a shopping receptacle 100D with shielding on all of the walls. In the illustrated example, the shopping receptacles 100C and 100D are shopping baskets that can be carried by users.

With reference to FIG. 2A, the shopping receptacle 100C generally comprise a container 120 to store or hold items and one or more handles 105 to hold, push, lift, or otherwise move the shopping receptacle 100C. Generally, the specific design of the shopping receptacle 100C may vary depending on the particular implementation. For example, the shopping receptacle 100C may include one or more additional handles 105 (or no handles), one or more additional containers 120 (e.g., a second or third container to hold items), and the like.

As illustrated, the container 120 of the shopping receptacle 100C generally has a plurality of sides, which may include one or more bottom sides (e.g., on the bottom of the container) onto which items can be placed (e.g., to support the items against gravity), one or more wall sides, and/or one or more top sides (e.g., if the container has a lid). Generally, the specific presence (or absence) and arrangement of sides may vary depending on the particular implementation. In the illustrated example, the container 120 includes four wall sides. The container 120 includes an opening at the top, allowing users to place items into the container 120 as well as to remove items from the container 120.

In some aspects, all four wall sides of the container 120 may be the same (e.g., there may be no anterior or posterior side, as the shopping receptacle 100C may be held in multiple orientations). In some embodiments, the container 120 includes two longitudinal or axial sides (opposite each other) as well as two transverse sides. In some embodiments, the longitudinal and transverse sides may be defined based on a defined orientation of the shopping receptacle 100C, such as based on the location and/or orientation of the handles 105. For example, the longitudinal sides may be longer than the transverse sides (e.g., if the shopping receptacle 100C is rectangular). In some embodiments, the longitudinal and transverse sides may are defined based on the orientation that the shopping receptacle 100C is placed when the items are scanned. For example, the shopping receptacle 100C may be placed on a conveyor belt that is narrower than the length of the longitudinal sides, such that the shopping receptacle 100C must be oriented with one of the transverse sides facing forwards with respect to the direction of movement of the conveyor and the longitudinal sides face towards the right and left side of the conveyor.

In the illustrated example, the container 120 of the shopping receptacle 100C includes RF shielding 130A-B on two sides (referred to in some aspects as blocked or shielded sides). Specifically, the RF shielding 130 covers the transverse wall sides (e.g., the front and back of the container 120). The left and right longitudinal wall sides of the container 120 are unshielded sides 125A-B. In this way, RF may be able to permeate or penetrate into the container 120 when transmitted from the left or right side of the container 120 (or from above and below, if these sides are left unshielded as well), but cannot penetrate or permeate into the container 120 if transmitted from the front or rear of the container 120.

In some embodiments, as discussed above, the configuration of RF shielding 130 on the shopping receptacle 100C is selected or determined based on the configuration of the corresponding RFID sensors. For example, the shopping receptacle 100C may be used in conjunction with RFID sensors that are arranged to scan items as receptacles are moved from right to left or left to right of the sensor (with either unshielded side 125A-B of the receptacles facing the sensor). That is, because the depicted shopping basket may be placed facing forward or backward, both of the longitudinal sides may be left unshielded to ensure that items container therein are visible to the sensor.

Turning to FIG. 2B, the shopping receptacle 100D similarly comprises a container 120 to store or hold items and one or more handles 105 to hold, push, lift, or otherwise move the shopping receptacle 100D.

As illustrated, the container 120 of the shopping receptacle 100D also has a plurality of sides, and the container 120 of the shopping receptacle 100D includes RF shielding 130A-D on four sides (referred to in some aspects as blocked or shielded sides). Specifically, the RF shielding 130 covers the all four wall sides of the container 120. In this way, RF may be unable to permeate or penetrate into the container 120 when transmitted from any of the wall sides of the container 120, but may be able to penetrate or permeate the container 120 if transmitted from directly above (through the opening in the container) or below (which may be unshielded).

In some embodiments, the configuration of RF shielding 130 on the shopping receptacle 100D is similarly selected or determined based on the configuration of the corresponding RFID sensors. For example, the shopping receptacle 100D may be used in conjunction with RFID sensors that are arranged to scan items from above or below as receptacles are moved over or under the sensor. In this way, the particular orientation of the shopping receptacle 100D may be irrelevant (so long as the bottom surface remains on the bottom) during scanning, and the shopping receptacle 100D may be placed in any suitable orientation to be scanned (while the shopping receptacle 100C must generally be placed with one of the unshielded longitudinal sides 125 facing the sensor).

Although the illustrated examples in FIGS. 1A, 1B, 2A, and 2B depict specific and static configurations of RF shielding for conceptual clarity, in embodiments, the RF shielding can generally be arranged in any suitable configuration. For example, although the depicted shopping receptacles 100A-D include shielding that entirely covers one or more sides, in some aspects, one or more sides may be partially shielded (e.g., with RF shielding that covers a subset of the side). Further, although the depicted shopping receptacles 100A-D include openings on the top side, in some embodiments, the shopping receptacle may include a lid (with or without RF shielding). For example, the shopping receptacle may include a lid and RF shielding on all sides, such that RF radiation cannot permeate the container until the lid is opened.

Figure 3:
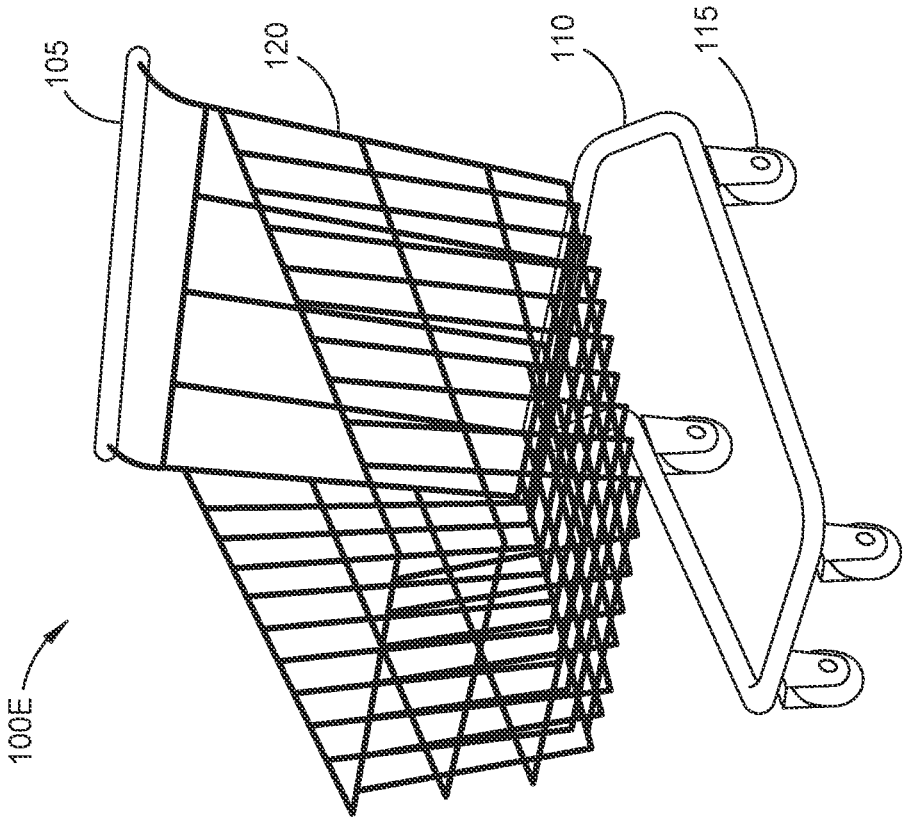
FIG. 3 depicts an example removable RF shielding, according to one embodiment disclosed herein.
Figure 3:
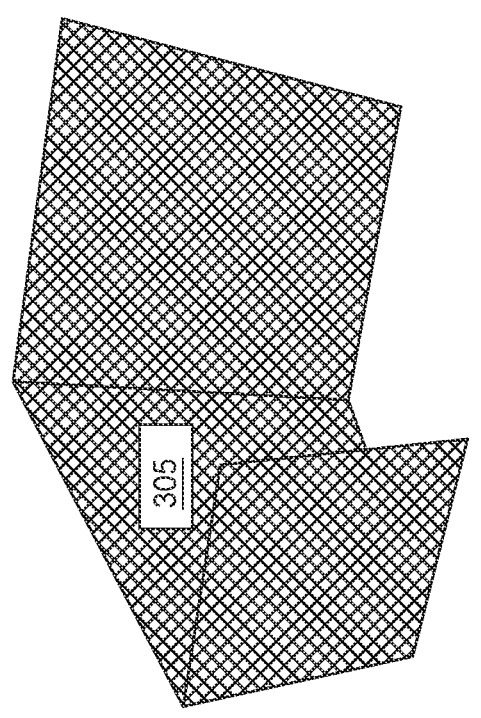

FIG. 3 depicts an example removable RF shielding 305, according to one embodiment disclosed herein. Specifically, FIG. 3 depicts a shopping receptacle 100E (with a handle 105, frame 110, wheels 115, and container 120) that has no RF shielding. That is, radio waves from RFID sensors may be able to permeate the container 120 of the shopping receptacle 100E from any direction. For example, the shopping receptacle 100E may be a conventional shopping cart.

As illustrated, the RF shielding 305 may be a removable shield that can be permanently or temporarily attached to the container 120 of the shopping receptacle 100E. For example, the RF shielding 305 may comprise a flexible mesh that can be wrapped around one or more sides of the shopping receptacle 100E, one or more panels that can be attached to the one or more sides, and the like. In some embodiments, the RF shielding 305 may be designed to enable retrofitting of conventional shopping receptacles to include suitable shielding for automated RFID-based item detection.

Generally, the RF shielding 305 may be attached using a variety of techniques or fasteners, such that each side of the container 120 can be selectively blocked or unblocked by attaching or removing all or a portion of the RF shielding 305. For example, the RF shielding 305 may be selectively installed on one or more sides of the container 120 depending on the specific configuration of the RFID sensor(s) used, as discussed above.

Figure 4:
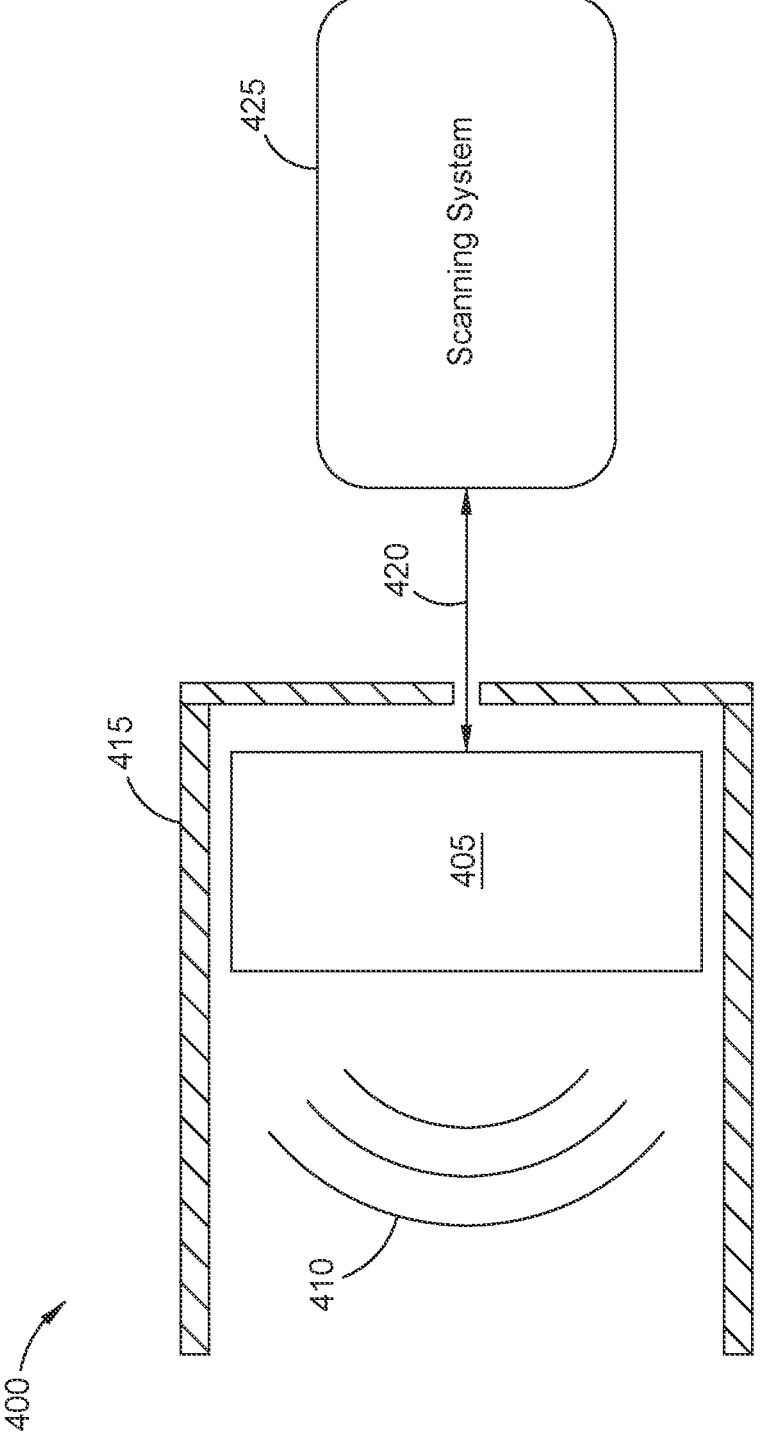
FIG. 4 depicts an example environment for shielded RFID sensors, according to one embodiment disclosed herein.

FIG. 4 depicts an example environment 400 for shielded RFID sensors, according to one embodiment disclosed herein. In some embodiments, as discussed above, RFID sensors or readers may generally be relatively directionless, in that they can sense or detect RFID tags in any location (as long as the tags are within the detection range of the sensor). In some embodiments, therefore, the system may use RF shielding to limit the visibility of the RFID sensor(s), thereby improving item detection and enabling the system to associate items with specific users.

In the illustrated example, RF shielding 415 is arranged to partially surround an RFID sensor 405. As discussed above, the RF shielding 415 may generally comprise a variety of materials and structures, such as a conductive (e.g., metal) mesh, solid panels, and the like. The RF shielding 415 is generally impermeable to the radio waves 410 used by the RFID sensor 405, such that the RFID sensor 405 cannot detect RFID tags that are blocked by the RF shielding 415. The RF shielding 415 can generally be configured to cover or block one or more sides of the RFID sensor 405, while leaving one or more other sides unblocked. For example, the RF shielding 415 may be a cylinder or box with one end open, allowing radio waves 410 to enter and exit via the opening. In this way, the RFID sensor 405 may be able to identify RFID tags only if they are in front of this opening (e.g., within line of sight of the RFID sensor 405).

In the illustrated embodiment, the RFID sensor 405 is communicatively coupled with a scanning system 425. The scanning system 425 generally corresponds to a computational system that controls the RFID sensor 405 and/or receives information collected by the RFID sensor 405. For example, the RFID sensor 405 may indicate, to the scanning system 425, any unique identifiers of RFID tags that it detects.

In some embodiments, the scanning system 425 is part of an inventory or item management system, such as a check-out system in a retail establishment, as discussed above. For example, the scanning system may be used to identify specific item(s) in the shopping receptacle (e.g., based on a mapping of RFID identifiers to UPCs) and facilitate or perform check-out. For example, the scanning system 425 may identify the user of the shopping receptacle (e.g., using facial recognition, manual self-identification, scanning of a unique identifier, such as an RFID card of the user, and the like), and associate the detected items with the user's account or profile (e.g., to automatically charge them accordingly). As another example, the scanning system 425 may present the detected items and/or pricing information (e.g., via a display of a check-out kiosk) and allow the user to complete the transaction.

In this way, the scanning system 425 and shielded RFID sensor 405 can substantially reduce error and provide improved efficiency and operability of the retail environment.

Figure 5:
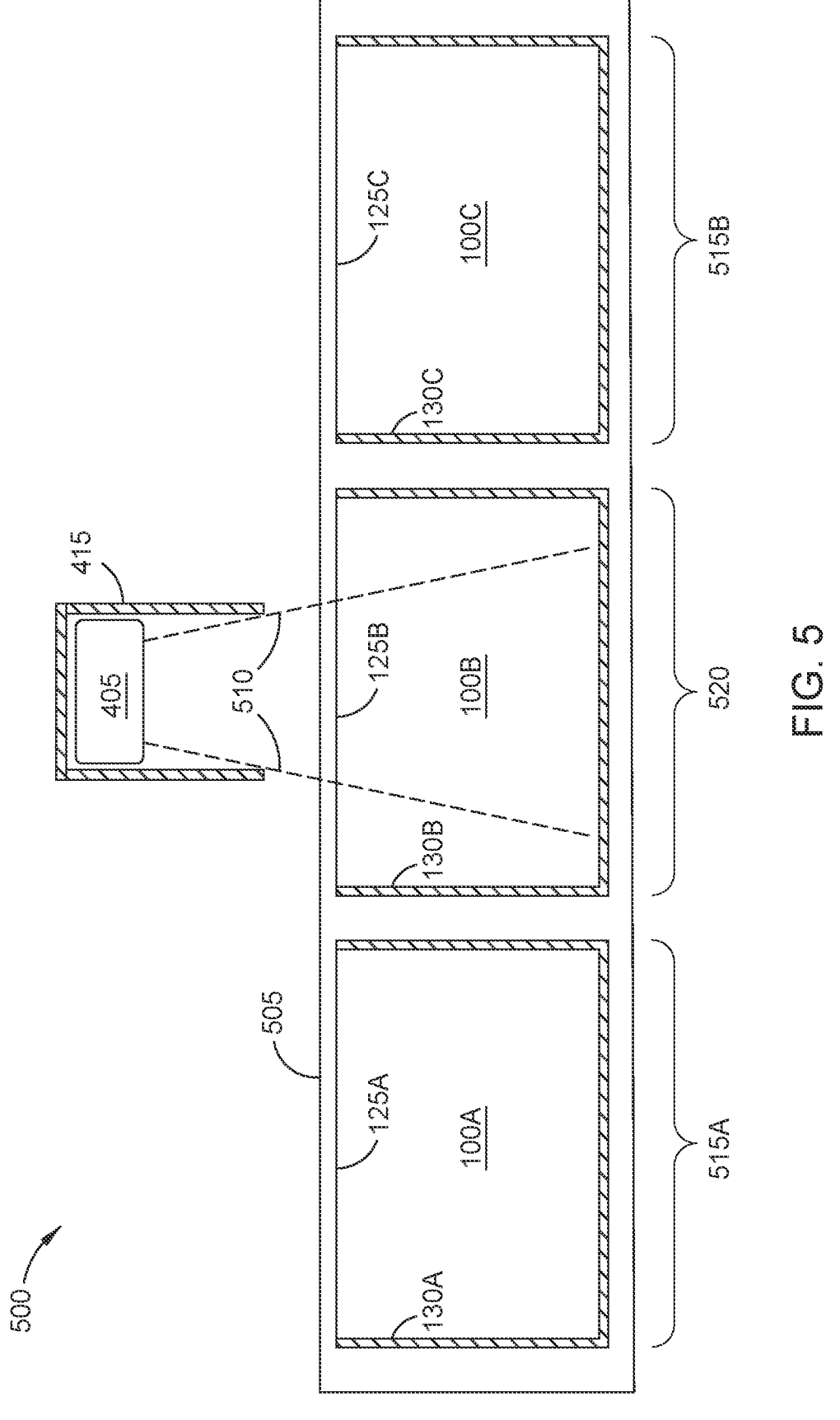
FIG. 5 depicts an example environment for using shielded RFID sensors and selectively shielded shopping receptacles, according to one embodiment disclosed herein.

FIG. 5 depicts an example environment 500 for using shielded RFID sensors and selectively shielded shopping receptacles, according to one embodiment disclosed herein.

Specifically, in the illustrated example, an RFID sensor 405 (with RF shielding 415) is configured to scan or detect items in shopping receptacles 100A-C. In the illustrated example, the shopping receptacles 100A-C are moved along a conveyor component 505 past the RFID sensor 405. Generally, the conveyor component 505 may comprise a variety of active or passive components. For example, in some embodiments, the conveyor component 505 includes one or more active or moving components to physically move shopping receptacles 100 along a directed path. Such moving components may generally take a variety of forms, depending on the particular implementation. For example, the conveyor component 505 may comprise one or more components that the shopping receptacles 100 are placed upon (e.g., a conveyor belt or system of rollers), may comprise one or more components that engage with one or more components of the shopping receptacles (e.g., pushers, pullers, arms or protrusions that engage with the receptacles, and the like), and the like.

In some embodiments, the conveyor component 505 moves the shopping receptacles 100 along the path using one or more passive components, such as an inclined ramp (e.g., allowing the receptacles to slide down the ramp via gravity). In some embodiments, the conveyor component 505 may be entirely passive, allowing users to move the shopping receptacles 100 along the path. For example, in some embodiments, the conveyor component 505 may be a defined path (e.g., defined visually using lines or arrows on the ground) along which users push, pull, or carry shopping receptacles 100. In some embodiments, the conveyor component 505 comprises physical guides, such as railings, walls, and the like to assist or enforce the movement along the path (e.g., to force shopping baskets into a desired orientation for scanning, to ensure the shopping receptacles 100 are near-enough to the RFID sensor 405, and the like).

In the illustrated example, as depicted by sightlines 510, the RFID sensor 405 is able to detect RFID tags that are in the shopping receptacle 100B. However, due to the RF shielding 415 around the RFID sensor 405 and/or the RF shielding 130 on each shopping receptacle 100, the items in the shopping receptacles 100A and 100C are not detectable by the RFID sensor 405. That is, the shopping receptacle 100B is in a sensing position 520 for the RFID sensor 405, while the shopping receptacles 100A and 100C are in non-sensing positions 515A and 515B, respectively.

As discussed above, a sensing position (e.g., sensing position 520) of an RFID sensor (e.g., RFID sensor 405) generally corresponds to a position (also referred to as a location or area) and/or orientation (or a range of orientations) of a shopping receptacle 100 where the items therein can be detected by the RFID sensor. As illustrated, when the shopping receptacle 100 and/or container are in the sensing position 520, an unshielded side 125 of the receptacle faces towards the RFID sensor 405 (and the unshielded side of the RF shielding 415 faces towards the container or receptacle that is in the sensing position 520). Generally, any position or orientation of a shopping receptacle 100 where an RF shield (which may include the RF shielding 415, the RF shielding 130, or both) is between the RFID sensor 405 and the contents of the receptacle may be referred to as a non-sensing position.

Generally, shopping receptacles 100 may be moved past the RFID sensor 405 (via the conveyor component 505) continuously or intermittently. That is, in some embodiments, each shopping receptacle 100 may be positioned in the sensing position 520 and left stationary for some period of time, while the RFID sensor 405 identifies the items therein. In other embodiments, the shopping receptacles 100 may move continuously through the sensing position 520, and the RFID sensor 405 may identify the items as each receptacle moves past.

Although depicted as a sequence of shopping receptacles 100 moving along conveyor component 505, in some embodiments, the system may use a stationary approach. For example, rather than identifying items as receptacles move past the RFID sensor 405, users may place their shopping receptacle 100 into the designated area (e.g., placing a shopping basket in a marked outline on a counter), wait for the scan to complete, and then continue with their items.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the scanning system 425 could execute on a computing system in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A sensing system comprising:
a container comprising:
  a plurality of sides comprising a bottom side on which items can be placed and one or more wall sides to contain the items, wherein:
    at least a first side of the plurality of sides is permeable to a radio frequency (RF) used to identify items in the container, and
    one or more blocking sides of the plurality of sides comprise a first RF shield arranged to block the one or more sides such that radio waves used to identify items in the container are blocked by the one or more blocking sides, wherein the one or more blocking sides comprise at least one longitudinal wall side of the plurality of sides of the container, wherein at least one longitudinal wall side of the plurality of sides is unshielded; and
  at least one opening through which items can be placed into the container; and
a radio frequency identification (RFID) sensor, wherein:
  the RFID sensor is associated with a sensing position and a non-sensing position, relative to the RFID sensor,
  the one or more blocking sides block RF signals from the RFID sensor from entering the container and identifying items in the container when the container is in the non-sensing position of the RFID sensor,
  the first side of the container allows the RF signals from the RFID sensor to permeate the container and identify items in the container when the container is in the sensing position of the RFID sensor, and
  the container can be moved into and out of the sensing position;
wherein:
  the first RF shield is arranged such that:
    radio waves from the RFID sensor can permeate the container and identify items in the container when the container is positioned in the sensing position relative to the RFID sensor, and
    radio waves from the RFID sensor are blocked from permeating the container when the container is positioned in the non-sensing position relative to the RFID sensor,
  the RFID sensor comprises a second RF shield, the second RF shield arranged to block one or more sides of the RFID sensor,
  the radio waves from the RFID sensor permeate one or more non-blocked sides of the RFID sensor and one or more non-blocked sides of the container when the container is positioned in the sensing position, and
  the radio waves from the RFID sensor are blocked by at least one of (i) the one or more blocked sides of the RFID sensor or (ii) the one or more blocking sides of the container when the container is positioned in the non-sensing position.

2. The sensing system of claim 1, wherein the one or more blocking sides are formed at least in part by the first RF shield.

3. The sensing system of claim 1, wherein the second RF shield is removable such that the one or more blocking sides can be selectively blocked or unblocked by the first RF shield.

4. The sensing system of claim 1, further comprising a conveyance component to move containers past the RFID sensor.

5. The sensing system of claim 1, wherein a single container can occupy the sensing position at a time.

6. The sensing system of claim 1, wherein the one or more blocking sides comprise transverse wall sides of the plurality of sides of the container.

7. The sensing system of claim 1, wherein the one or more blocking sides comprise the bottom side.

8. A system comprising:

a container comprising a plurality of sides comprising a bottom side on which items can be placed and one or more wall sides to contain the items, wherein:

at least a first side of the plurality of sides is permeable to a radio frequency (RF) used to identify items in the container, and one or more blocking sides of the plurality of sides comprise an RF shield arranged to block the one or more sides such that radio waves used to identify items in the container are blocked by the one or more blocking sides, wherein the one or more blocking sides comprise at least one longitudinal wall side of the plurality of sides of the container, wherein at least one longitudinal wall side of the plurality of sides is unshielded; and at least one opening through which items can be placed into the container; and a radio frequency identification (RFID) sensor, wherein:

the RFID sensor is associated with a sensing position and a non-sensing position, relative to the RFID sensor, the one or more blocking sides block RF signals from the RFID sensor from entering the container and identifying items in the container when the container is in the non-sensing position of the RFID sensor, and the first side of the container allows the RF signals from the RFID sensor to permeate the container and identify items in the container when the container is in the sensing position of the RFID sensor, and the container can be moved into and out of the sensing position;

wherein:

the first RF shield is arranged such that:

radio waves from the RFID sensor can permeate the container and identify items in the container when the container is positioned in the sensing position relative to the RFID sensor, and radio waves from the RFID sensor are blocked from permeating the container when the container is positioned in the non-sensing position relative to the RFID sensor, the RFID sensor comprises a second RF shield, the second RF shield arranged to block one or more sides of the RFID sensor, the radio waves from the RFID sensor permeate one or more non-blocked sides of the RFID sensor and one or more non-blocked sides of the container when the container is positioned in the sensing position, and the radio waves from the RFID sensor are blocked by at least one of (i) the one or more blocked sides of the RFID sensor or (ii) the one or more blocking sides of the container when the container is positioned in the non-sensing position.

9. The system of claim 8, wherein the one or more blocking sides are formed at least in part by the first RF shield.

10. The system of claim 8, wherein the RF shield is removable such that the one or more blocking sides can be selectively blocked or unblocked by the first RF shield.

11. The system of claim 8, further comprising a conveyance component to move containers past the RFID sensor.

12. The system of claim 8, wherein a single container can occupy the sensing position at a time.

13. The system of claim 8, wherein the one or more blocking sides comprise transverse wall sides of the plurality of sides of the container.

14. The system of claim 8, wherein the one or more blocking sides comprise the bottom side.

15. A system comprising:

a container comprising a plurality of sides, wherein:

at least a first side of the plurality of sides is permeable to a radio frequency (RF) used to identify items in the container, wherein the first side corresponds to a sensing position of a radio frequency identification (RFID) sensor, and one or more blocking sides of the plurality of sides comprise an RF shield arranged to block the one or more sides, wherein the one or more blocking sides comprise at least one longitudinal wall side of the plurality of sides of the container, wherein at least one longitudinal wall side of the plurality of sides is unshielded, such that:

radio waves from the RFID sensor can permeate the container when the container is positioned in the sensing position relative to the RFID sensor, and radio waves from the RFID sensor are blocked from permeating the container when the container is positioned in a non-sensing position relative to the RFID sensor; and the RFID sensor, wherein:

the RFID sensor is associated with the sensing position and the non-sensing position, relative to the RFID sensor, the one or more blocking sides block RF signals from the RFID sensor from entering the container and identifying items in the container when the container is in the non-sensing position of the RFID sensor, and the first side of the container allows the RF signals from the RFID sensor to permeate the container and identify items in the container when the container is in the sensing position of the RFID sensor, and the container can be moved into and out of the sensing position;

wherein:

the first RF shield is arranged such that:

radio waves from the RFID sensor can permeate the container and identify items in the container when the container is positioned in the sensing position relative to the RFID sensor, and radio waves from the RFID sensor are blocked from permeating the container when the container is positioned in the non-sensing position relative to the RFID sensor, the RFID sensor comprises a second RF shield, the second RF shield arranged to block one or more sides of the RFID sensor, the radio waves from the RFID sensor permeate one or more non-blocked sides of the RFID sensor and one or more non-blocked sides of the container when the container is positioned in the sensing position, and the radio waves from the RFID sensor are blocked by at least one of (i) the one or more blocked sides of the RFID sensor or (ii) the one or more blocking sides of the container when the container is positioned in the non-sensing position.

\* \* \* \* \*